(12) United States Patent
Akagawa et al.

(10) Patent No.: US 7,234,020 B2
(45) Date of Patent: Jun. 19, 2007

(54) FAULT NOTIFICATION BASED ON VOLUME ACCESS CONTROL INFORMATION

(75) Inventors: Etsutaro Akagawa, Kawasaki (JP); Hiroshi Furukawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 369 days.

(21) Appl. No.: 10/629,554

(22) Filed: Jul. 30, 2003

(65) Prior Publication Data
US 2004/0210791 A1 Oct. 21, 2004

(30) Foreign Application Priority Data
Apr. 21, 2003 (JP) ............................. 2003-115181

(51) Int. Cl.
*G06F 12/00* (2006.01)
(52) U.S. Cl. ........................ 711/111; 714/48
(58) Field of Classification Search ................. 711/4, 711/111, 112, 114, 163; 714/125, 48, 57; 710/19, 36, 38; 709/214, 225, 229
See application file for complete search history.

(56) References Cited

U.S. PATENT DOCUMENTS

| 5,574,856 | A | 11/1996 | Morgan et al. |
|---|---|---|---|
| 5,584,008 | A | 12/1996 | Shimada et al. |
| 5,790,775 | A | 8/1998 | Marks et al. |
| 5,919,258 | A | 7/1999 | Kayashima et al. |
| 6,199,105 | B1 | 3/2001 | Soejima et al. |
| 6,631,442 | B1 | 10/2003 | Blumenau |
| 2001/0054093 | A1* | 12/2001 | Iwatani ...................... 709/223 |
| 2002/0078296 | A1 | 6/2002 | Nakamura et al. |
| 2002/0129246 | A1 | 9/2002 | Blumenau et al. |
| 2002/0174315 | A1 | 11/2002 | Yamamoto |
| 2003/0055932 | A1 | 3/2003 | Brisse |
| 2003/0055933 | A1* | 3/2003 | Ishizaki et al. .............. 709/223 |
| 2003/0084237 | A1 | 5/2003 | Yoshida et al. |
| 2003/0126327 | A1 | 6/2003 | Pesola et al. |
| 2003/0172069 | A1* | 9/2003 | Uchiyama et al. .............. 707/9 |
| 2003/0221063 | A1 | 11/2003 | Eguchi et al. |

(Continued)

FOREIGN PATENT DOCUMENTS

| JP | 11-085589 | | 3/1999 |
|---|---|---|---|
| JP | 2002-278905 | * | 9/2002 |
| JP | 2002278905 | | 9/2002 |

*Primary Examiner*—Woo H. Choi
(74) *Attorney, Agent, or Firm*—Mattingly, Stanger, Malur & Brundidge, P.C.

(57) ABSTRACT

In case a fault has occurred in a volume, it was so far difficult to correctly notify a fault by using a host computer which can access the volumes managed by a management computer that integrally manages a plurality of devices constituting a network. The management program of the invention is executed by the management computer connected to computers and to a plurality of storage devices for managing the volumes connected to the computers through a SAN (storage area network). The management program executes a procedure for receiving a notice of fault in the volume from the storage devices, a procedure for receiving volume access control information from a plurality of storage devices for specifying the computers that can access the volumes, and a procedure for notifying the fault in the volume to the computers that are permitted to access the volumes based on the volume access control information.

10 Claims, 11 Drawing Sheets

U.S. PATENT DOCUMENTS

| | | |
|---|---|---|
| 2003/0229689 A1 | 12/2003 | Raghavan et al. |
| 2003/0229764 A1* | 12/2003 | Ohno et al. ................. 711/147 |
| 2003/0233596 A1 | 12/2003 | Corbin et al. |
| 2004/0068561 A1* | 4/2004 | Yamamoto et al. ......... 709/224 |
| 2004/0073831 A1 | 4/2004 | Yanai et al. |
| 2004/0083401 A1* | 4/2004 | Furukawa et al. ............. 714/7 |

* cited by examiner

FIG.3A

VOLUME ACCESS CONTROL INFORMATION

| NAME OF VOLUME (31) | NAME OF HOST (32) |
|---|---|
| VOLUME 1 | HOST A |
| VOLUME 2 | HOST A, HOST B |
| VOLUME 3 | HOST C |
| ...... | ...... |

FIG.3B

VOLUME STATUS INFORMATION AND PERFORMANCE INFORMATION

| NAME OF VOLUME (31) | STATUS INFORMATION (33) | PERFORMANCE INFORMATION (I/O NUMBER/ms) (34) |
|---|---|---|
| VOLUME 1 | PHYSICAL FAULT | 0 |
| VOLUME 2 | WRITE INHIBITED | 120 |
| VOLUME 3 | ACCESSIBLE | 350 |
| ...... | ...... | ...... |

FIG.4

PHYSICAL CONNECTION INFORMATION

| NAME OF INTERFACE (41) | NAME OF INTERFACE TO BE CONNECTED (42) |
|---|---|
| 00.00.00.00.00.00.00.01 | 00.00.00.00.00.00.00.04<br>00.00.00.00.00.00.00.05 |
| 00.00.00.00.00.00.00.02 | 00.00.00.00.00.00.00.06 |
| 00.00.00.00.00.00.00.03 | 00.00.00.00.00.00.00.07<br>00.00.00.00.00.00.00.08 |
| ...... | ...... |

FIG.5

PASSAGE ACCESS CONTROL INFORMATION

| NAME OF INTERFACE | NAME OF COMMUNICABLE INTERFACE |
|---|---|
| 00.00.00.00.00.00.00.01 | 00.00.00.00.00.00.00.04 |
| 00.00.00.00.00.00.00.02 | — |
| 00.00.00.00.00.00.00.03 | 00.00.00.00.00.00.00.08 |
| ...... | ...... |

FIG.6

APPLICATION-SETTING INFORMATION

| NAME OF HOST | NAME OF SERVICE | NAME OF CLIENT | NAME OF ACCESSIBLE VOLUME | ... |
|---|---|---|---|---|
| HOST 1 | FILE SHARING SERVICE | CLIENT 1, CLIENT 2 | LUN 1 | ...... |
| HOST 1 | WEB INSPECTION SERVICE | CLIENT 2, CLIENT 3 | LUN 2, LUN 3 | ...... |
| HOST 2 | TIME SERVICE | ALL CLIENTS | LUN 4 | ...... |
|  | ...... | ...... | ...... | ...... |

FIG.10A

MANAGEMENT TABLE

| NAME OF CLIENT'S COMPUTER /100011 | NAME OF VOLUME USED (LU) /100012 | STATUS INFORMATION AND PERFORMANCE INFORMATION OF LU (UTILIZATION PERCENTAGE) /100013 | NAME OF HOST COMPUTER OFFERING THE SERVICE /100014 | NAME OF SERVICE OPERATING ON HOST COMPUTERS /100015 | ...... |
|---|---|---|---|---|---|
| CLIENT A | VOLUME 1 | PHYSICAL FAULT | HOST A | SHARED FILE A | ...... |
|  | VOLUME 3 | 50 | HOST A | TIME SERVICE |  |
|  | VOLUME 5 | PHYSICAL FAULT | HOST B | SHARED FILE B |  |
| CLIENT B | VOLUME 2 | PHYSICAL FAULT | HOST A | SHARED FILE A | ...... |
| CLIENT C | VOLUME 4 | 10 | HOST A | TIME SERVICE |  |
| CLIENT D | VOLUME 6 | PHYSICAL FAULT | HOST B | SHARED FILE B |  |
| CLIENT E | VOLUME 7 | WRITE INHIBITED | HOST B | WEB INSPECTION |  |
| ...... | ...... | ...... | ...... | ...... | ...... |

FIG.10B

MANAGEMENT TABLE

| NAME OF SERVICE OPERATING ON HOST COMPUTERS | NAME OF VOLUME USED (LVEV) | STATUS INFORMATION AND PERFORMANCE INFORMATION OF LVEV (EMPTY CAPACITY) | NAME OF HOST COMPUTERS OFFERING THE SERVICE | NAME OF VOLUME ON THE HOST TO BE USED | ...... |
|---|---|---|---|---|---|
| SHARED FILE A | VOLUME 11 | PHYSICAL FAULT | HOST A | VOLUME 21 |  |
|  | VOLUME 11 | 5 | HOST A | VOLUME 21 |  |
| SHARED FILE B | VOLUME 11 | 30 | HOST B | VOLUME 23 | ...... |
|  | VOLUME 11 | 5 | HOST B | VOLUME 23 |  |
| TIME SERVICE | VOLUME 12 | 50 | HOST A | VOLUME 22 | ...... |
|  | VOLUME 13 | 35 | HOST A | VOLUME 22 |  |
| WEB INSPECTION | VOLUME 14 | WRITE INHIBITED | HOST B | VOLUME 23 |  |
| ...... | ...... | ...... | ...... | ...... | ...... |

FIG.12

MANAGING PERSON ACCESS CONTROL INFORMATION

| MANAGEMENT ID /121 | VOLUME THAT CAN BE MANAGED /122 | COMPUTER THAT CAN BE MANAGED /123 | ... |
|---|---|---|---|
| MANAGING PERSON 1 | VOLUME 1, VOLUME 3, ... | HOST 1, CLIENT 1, ... | ...... |
| MANAGING PERSON 2 | VOLUME 12, VOLUME 24, ... | SWITCH 1, CLIENT 2, ... | ...... |
| MANAGING PERSON 3 | VOLUME 23, ... | ALL CLIENTS | ...... |
|  | ...... | ...... | ...... |

FAULT NOTIFICATION BASED ON VOLUME ACCESS CONTROL INFORMATION

BACKGROUND OF THE INVENTION

1. Field of the Invention

This invention relates to a technology for managing a network system and, particularly, to a technology for managing a SAN.

2. Description of the Related Art

In recent years, there has been provided a network system called SAN (storage area network). The SAN is constituted by a storage device having a storage area of a large capacity and, connected thereto, host computers that use the data in the storage region of the storage device. The SAN uses, in many cases, a protocol compatible with an SCSI (small computer system interface). Therefore, the storage devices constituting the SAN are accessible from any host computer provided it is connected to the SAN, arousing a problem of security.

To cope with this problem, there has been known an access control technology for limiting the host which can access a unit of volume (see Japanese Unexamined Patent Publication (Kokai) No. 2002-278905, page 8, FIG. 1). Namely, based on a list of access controls that have been registered in advance, the control unit in the storage device judges whether the host computer is capable of making an access to a unit of volume. In the above publication, further, the storage device specifies a host computer that can affect the fault in the volume by utilizing an access control table, and notifies the presence and status of the fault.

In the above publication, the memory device sets the access control table and notifies the fault. In the system which uses a plurality of storage devices, however, the access control table must be set for each of the storage devices requiring a cumbersome operation.

In the above publication, further, consideration has been given to only the access control table that is managed by the storage device, but no consideration has been given to the access control tables managed by other devices. For example, the storage device and the host computer may often be connected together through an FC (fiber channel) switch. The FC switch, too, involves the access control technology (zoning, etc.) like the storage device. To notify the fault to only those host computers using the volumes, therefore, consideration must also be given to the access control technology for the FC switches. In the above publication, however, attention has not been given to the access control tables managed outside the storage devices.

SUMMARY OF THE INVENTION

It is an object of the present invention to correctly notify a fault, in case a fault has occurred in the volume, by using a host computer which can access the volumes as managed by a management computer that integrally manages a plurality of devices constituting a network.

A management program according to an embodiment of the present invention is connected to one or most host computers and to a plurality of storage devices having access control means for controlling input and output to and from the volumes based on access control information for specifying the computers that can access the volumes. In case a fault has occurred in a volume, fault information is notified to only those host computers that are permitted to access the volumes.

The management program according to another embodiment of the present invention is connected to one or more memory devices, to one or more host computers and to a connection device having a plurality of interfaces and a control unit that inputs and outputs information among the interfaces based on the passage control information defining the input and output among the interfaces. In case a fault has occurred in a volume, fault information is notified to only those host computers that are permitted to access the volumes and that have a passage between the volumes and the host computers.

Other features of the present invention will become obvious from the description of the specification and the accompanying drawings.

BRIEF DESCRIPTION OF THE DRAWINGS

FIG. 3 is a table illustrating volume access control information according to the embodiment;

FIG. 4 is a table illustrating physical connection information according to the embodiment;

FIG. 5 is a table illustrating passage access control information according to the embodiment;

FIG. 6 is a table illustrating application-setting information according to the embodiment;

FIG. 10 is a diagram illustrating management tables according to the embodiment;

FIG. 12 is a table illustrating managing person access control information according to the first and second embodiments.

DESCRIPTION OF THE PREFERRED EMBODIMENTS

Figure 1:
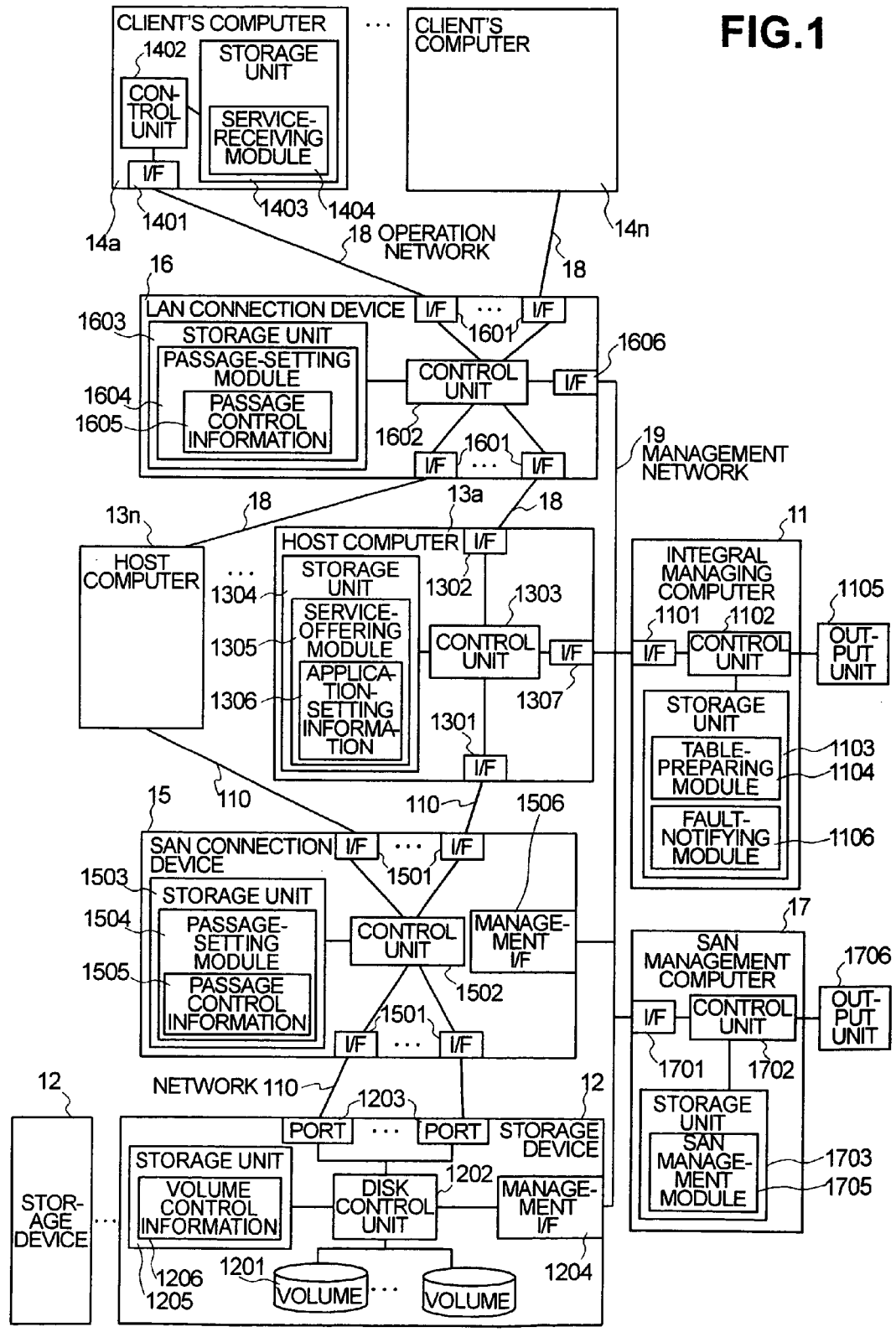
FIG. 1 is a diagram illustrating the constitution of a network system according to a first embodiment.

FIG. 1 is a diagram illustrating the constitution of a network according to a first embodiment of the invention.

The network system of this embodiment includes an integral managing computer 11, a plurality of storage device 12a, storage device 12n (generally called storage devices 12), one or more host computer 13a, ..., host computer 13n (generally called host computers 13), one or more client computer 14a, ..., client computer 14n (generally referred to as client computers 14), one or more SAN connection devices 15, one or more LAN connection devices 16, and one or more SAN management computers 17. The host computers 13, SAN connection devices 15 and storage devices 12 are connected together through a network 110 (e.g., a fiber channel (FC)).

The storage device 12 is a disk unit device managed, for example, by RAID (redundant array of inexpensive disks), and includes a plurality of volumes 1201, a disk control unit 1202, a plurality of ports 1203 connected to the host computers 13 and to the SAN connection devices 15 through the network 110, a management interface 1204 connected to a management network 19, and a storage unit 1205 storing operation systems, applications and volume access control information 1207. The volumes 1201 include volumes (logical units (LUs)) specified by addresses that can be identified by the host computer 13 and volumes (logical devices (LDEVs) assigned to the physical storage region in the storage device 12 in relation to the LUs. Further, a processor or a disk control unit 1202 in the port 1203 may realize a function of a conversion system (NFS, etc.) for converting file data and block data between the client computers 14 and the volumes 1201.

The volume 1201 stands for a unit storage region formed by logically dividing a physical storage region of one or a plurality of storage devices 12. In this embodiment, the description of hardware of the volume does not directly matter. For easy comprehension, therefore, the following description uses the volume which is a logical management unit.

In response to the request of input/output issued from the host computer 13 specifying a logical address of the volume, the disk control unit 1202 controls the input and output to and from the volume 1201 according to a logical/physical conversion table for converting the logical address and physical address of the volume 1201, and controls the access to the volume 1201 from the host computer 13 based on volume access control information 1207 stored in the storage unit 1205.

FIG. 3A is a diagram illustrating the volume access control information included in the volume control information according to the embodiment, and FIG. 3B is a diagram illustrating the volume status information and the performance information according to the embodiment.

The volume access control information 1103 includes at least identification names 31 of volumes (inclusive of LUs, LDEVs) for setting the access right, and one or a plurality of host names 32 having access right for each of the volumes. The volume status and performance information 1206 includes status information 33 (such as presence of fault, whether data can be written, alert that will be issued when a value of performance information reaches a given threshold value), and performance information 34 (average I/O number (write, read, etc.) per a unit time, maximum storage capacity, empty capacity, increase in the amount of use, etc.). The volume status and performance information 1206 covers the storage region in the storage device 12. When it is intended to also manage the volumes such as host computers 13, however, the volume status and performance information 1206 is handled as information same as that of FIG. 3B. This list is only one of many examples and there is no limit on the method of expression thereof.

The disk control unit 1202 transmits the volume access control information 1207 and the volume status and performance information 1206 to the table preparation module 1104 at regular intervals through the management network 19.

The volume access control information 1206, 1207 may be transmitted at a timing when the constituent information and status information are changed (such as when fault has occurred, when the value of performance information has exceeded a given threshold value) or when the management interface (I/F) 1307 has received a request for obtaining information from an external unit such as the integral managing computer 11. Information (inclusive of volume access control information 1206, 1207) necessary for controlling the management may be exchanged by using the network 110 or the operation network 18.

The host computer 13 is the one for offering services to the client computers 14 through the operation network 18, and includes a storage unit 1304, an operating system stored in the storage unit 1304, a control unit 1303 for executing the service-offering module 1305, an interface (I/F) 1302 for communication through the operation network 18, an interface (I/F) 1301 for communication with the storage device 12 through the network 110, and an interface (I/F) 1307 for communication through the management network 19.

Based on the application-setting information 1306 for each of the services, the service-offering module 1305 offers the resource (inclusive of data) related to the services of the host computer 13 to the client's computers 14 through the operation network 18.

FIG. 6 is a diagram illustrating the application-setting information in this embodiment.

The application-setting information includes names 61 of the host computers, service names 62 which the client's computers use as the host computers execute the service application, names 63 of the client's computers that utilize the service applications executed by the host computers, names 64 of the volumes that are accessing for each of the services, and information showing the operation environment of the services.

Here, the service application includes, for example, a file sharing service (network file system (NFS), etc.) for sharing a file among the specified client's computers, a web inspection service for laying open the location of resources (URL (uniform resource locator), etc.) that can be used for each of the client's computers, and a time service (network time protocol, etc.) for offering time data for the specified client's computers.

The names 64 of volumes for accessing the services may be the volumes 1201 in the storage device 12 or may include other volumes used at the time of practicing the services. For example, they may be the volumes on the storage unit or on the buffer of the host computer 13 or of the SAN connection device 15.

The control unit 1303 in the host computer 13 transmits the application-setting information 1306 to the tape preparation module 1104 through the management network 19 at regular intervals.

The application-setting information 1306 may be transmitted at a timing when the constituent information and status information are changed (such as when fault has occurred, when the value of performance information has exceeded a given threshold value) or when the management interface (I/F) 1307 has received a request for obtaining information from an external unit such as the integral managing computer 11. Further, information (inclusive of application-setting information) necessary for controlling the management may be exchanged by using the network 110 or the operation network 18.

The host computer 13 offers services to the "specified client's computers" by utilizing the data (block data and file data) stored in a "specified volume" based on the application-setting information 1306.

The client's computer 14 is the one for receiving services from the host computers 13 through the operation network 18, and includes a storage unit 1403, an operating system stored in the storage unit 1403, a service-receiving module 1404, a control unit 1402 for executing the application programs, and an interface (I/F) 1401 for communication through the operation network 18. The application-setting information 1306 may be held by the storage unit 1403 in the client's computer 14 and may be obtained from the client's computer.

The service-receiving module 1404 receives services executed by the host computer 13. Namely, the service-receiving module 1404 issues a request for service to the host computer. Upon receipt of this request, the service-offering module 1305 in the host computer 13 executes the user authentication based on the application-setting information 1306. Thereafter, the service-receiving module 1404 receives services for the specified client's computers 14 by utilizing a specified volume 1201.

The SAN connection device 15 is the one for connecting a plurality of devices that use the SAN such as FC switch and hub through a fiber channel (FC), and includes a storage unit 1503, an operating system stored in the storage unit 1503, a passage control module 1504, a control unit 1502 for executing application programs, an interface (I/F) 1501 for communication through the network 110, and an interface (I/F) 1506 for communication through the management network 19.

Based upon the passage access control information 1505, the control unit 1502 executes the passage control module 1504 thereby to execute an access control as a result of permitting communication among the specified interfaces 1501.

FIG. 5 is a diagram illustrating passage access control information according to the embodiment.

The passage access control information 1505 includes at least the names 51 of interfaces (port names) of the SAN connection device 15, and the names 52 of interfaces (port names) of the devices connected to the SAN connection device 15 that can communicate with the interfaces 51. The names of interfaces are for identifying the interfaces (ports) such as the port names, WWNs (world wide names) and IP addresses.

The control unit 1502 in the SAN connection device 15 transmits, at regular intervals, the passage access control information 1505 to the table preparation module 1104 through the management network 19. The passage access control information 1505 may be transmitted at a timing when the constituent information and status information are changed (such as when fault has occurred, when the value of performance information has exceeded a given threshold value) or when the management interface (I/F) 1307 has received a request for obtaining information from an external unit such as the integral managing computer 11. Information (inclusive of passage access control information 1505) necessary for controlling the management may be exchanged by using the network 110 or the operation network 18.

The LAN connection device 16 is the one for connecting a plurality of devices through the LAN such as IP switch and hub, and includes a storage unit 1603, an operating system stored in the storage unit 1603, a passage control module 1604, a control unit 1602 for executing application programs, an interface (I/F) 1601 for communication through the operation network 18, and an interface (I/F) 1606 for communication through the management network 19.

Based upon the passage access control information 1605, the control unit 1602 executes the passage control module 1604 thereby to execute an access control as a result of permitting communication among the specified interfaces 1601.

The passage access control information 1605 includes, as shown in FIG. 5, the names 61 of interfaces (port names) of the LAN connection device 16, and the names 62 of interfaces (port names) of the host computers 13 or of the client's computers 14 for which the communication is permitted for each of the interfaces.

The control unit 1602 in the LAN connection device 16 transmits, at regular intervals, the passage access control information 1605 to the table preparation module 1104 through the management network 19.

The passage access control information 1605 may be transmitted at a timing when the constituent information and status information are changed (such as when fault has occurred, when the value of performance information has exceeded a given threshold value) or when the management interface (I/F) 1307 has received a request for obtaining information from an external unit such as the integral managing computer 11. Information (inclusive of passage access control information 1605) necessary for controlling the management may be exchanged by using the network 110 or the operation network 18.

The SAN management computer 17 is the one for managing the storage device 12, host computers 13 and SAN connection device 15, and includes a storage unit 1703 for storing managing person access control information for limiting the volumes 1201 (such as LUs, LDEVs, host computers 13) or the computers 13, 14 that can be managed based on the management ID that is for identifying the managing person or the managing computer, and further includes a control unit 1702 for executing the operating systems stored in the storage unit 1703 and SAN management module application programs, an interface (I/F) 1701 for communication through the management network 19, and an output unit 1706 through which a topology map and the like are output from the control unit 1702. Based upon the management computer access control information, the SAN management module application program manages only those that are permitted to be managed among the volumes 1201 in the storage device 12 and the host computers 13 that are physically connected.

FIG. 12 is a diagram illustrating managing person access control information according to the embodiment.

The managing person access control information includes management IDs for identifying the managing person or the management computer, volumes (LUs, LDEVs, host computers 13, etc.) that can be managed for each of the management IDs, and information representing the computers 13, 14 that can be managed for each of the management IDs and the connection devices.

The integral managing computer 11 is the one for preparing a management table 10001 for specifying the client's computers 14 that affect the volumes, and includes a storage unit 1103, an operating system stored in the storage unit 1103, a control unit 1102 for executing the table preparation module 1104 and the application program, an interface (I/F) 1101 for communication with the storage device 12, host computers 13, SAN connection device 15, LAN connection device 16 and SAN management computer 17 through the management network 19, and an output 1105 for producing a relationship of the volumes 1201 that are accessible for each of the client's computers 14 upon receiving an instruction from the control unit 1102 based on the management table 10001 or of the volumes 1201 that are accessible for each of the applications executed by the host computers 13.

The modules such as the table preparation module 1104 and the like modules may realize their functions in the SAN management device 17, in one or a plurality of host computers 13, in one or a plurality of client's computers 14 or in other devices. Based on the management computer access control information, further, the table preparation module 1104 may manage only those that are permitted to be managed among the volumes 1201 in the storage device 12 and the host computers 13 that are physically connected.

The table preparation module 1104 issues, to the devices constituting the network of this embodiment, a request for obtaining information (e.g., SCSI inquiry command) to represent a relationship of physical connections for the interfaces of the devices. Upon obtaining, from the devices, information representing a relationship of physical connections for the interfaces of the devices, the table preparation module 1104 stores them in the storage unit 1103 as physical connection information 2000 representing the physical connection relationship in the network of this embodiment. The table preparation module 1104 may obtain information representing the physical connection relationships for the interfaces of the devices from the name management computer (not shown) such as a dynamic domain name system (DNS) server on the TCP/IP network that manages the interface names.

FIG. 4 is a diagram illustrating physical connection information according to the embodiment.

The physical connection information includes at least the names 41 of interfaces for identifying the interfaces of the devices and names 42 of interfaces to which the above interfaces are connected.

The table preparation module 1104 obtains, from the memory devices 12, volume access control information 1207 including the names 31 of the volumes in the storage devices 12, names 32 of hosts permitted to access for each of the volumes, status information 33 for each of the volumes, and performance information 34 for each of the volumes.

The table preparation module 1104 obtains, from each of the host computers 13, the application-setting information 1306 including services 61 offered by the host computers 13, "specified client's computers" 62 that offer services for each of the above services, and "specified volumes" 63 used for each of the services, and stores them in the memory unit 1103.

The table preparation module 1104 obtains passage access control information 1505 from the SAN connection device 15, and stores it in the storage unit 1103. The integral managing computer 11 obtains passage access control information 1605 from the LAN connection device 16 and stores it in the storage unit 1103.

The table preparation module 1104 obtains, from the SAN management computer 17, the management computer access control information for controlling the volumes 1201 that permit the management for each of the managing persons and for controlling the host computers 13, and stores it in the storage unit 1103. This embodiment describes volume access control information 1207, application-setting information 1306, passage access control information 1505 and passage access control information 1605 as access control information 3000 for limiting (or permitting) access to the volumes. However, any other access control information may also be included. In the serve-receiving module 1404 in the client's computer 14, for example, the client access control information is stored in the storage unit 1403 for inhibiting the issuance of a request for service for each of the services; i.e., the table preparation module 1104 may obtain the client access control information.

Based on the thus obtained physical connection information 2000, access control information 3000 and application-setting information 1306, the table preparation module 1104 prepares a management table 10001 including information representing the client's computers 14 that affect the volumes 1201, and stores it in the storage unit 1104.

Based on the management table 10001, the table preparation module 1104 sends, to the output unit 1105, the information that represents the status and performance of the volumes 1201 accessible for each of the client's computers 14 or for each of the applications executed by the host computers 13. The procedure of output may be such that the functions are realized by the control unit 1102 in the integral managing computer 1102 according to a module different from the table preparation module 1104 stored in the storage unit 1103.

Further, the table preparation module 1104 monitors the status information and performance information of the volumes 1201 that are accessible for each of the client's computers 14 or for each of the applications executed by the host computers 13, and issues an instruction related to the storage management to the storage device 12 based on the status information or the performance information. The procedure of issuing the instructions may be such that functions are realized by the control unit 1102 in the integral managing computer 1102 according to a module different from the table preparation module 1104 stored in the storage unit 1103.

The host computer 13, SAN connection device 15, LAN connection device 16 or client's computer 14 may secure in their storage unit 1304 the volumes that are to be used in the applications. Here, the application-setting information 1306 includes information for specifying the volumes such as the host computers 13 used at the time of making an access by the host computers 13 by executing the service application for each of the client's computers 14 that utilize the service application executed by the host computers 13. At this moment, the table preparation module 1104 may receive the application-setting information 1306 from the host computers 13 and may specify the volumes such as the host computers 13 accessible for each of the client's computers 14. At this moment, further, the table preparation module 1104 may receive, from the host computers 13, the status or performance information for each of the volumes such as the host computers 13, may specify the status or performance of the volumes such as the host computers 13 accessible for each of the host computers 13 based on the application-setting information 1306 and on the status or performance information for each of the volumes such as the host computers 13, and may execute, for the host computers 13, an instruction related to the management of the host computers 13 inclusive of the addition or deletion of volumes such as the host computers 13 based on the specified information.

In the embodiment of this invention, further, the modules such as the devices 11, 17 and 12 connected to the network realize their functions through their control units. Further, these modules may be stored in a storage medium (flexible disk, CD-ROM, DVD-ROM, semiconductor memory, transmission passages such as LAN and SAN) that can be read out by the control units. These modules may realize their functions based on a hardware constitution (semiconductor integrated circuit such as LSI (large scale integration) or the like).

Figure 2:
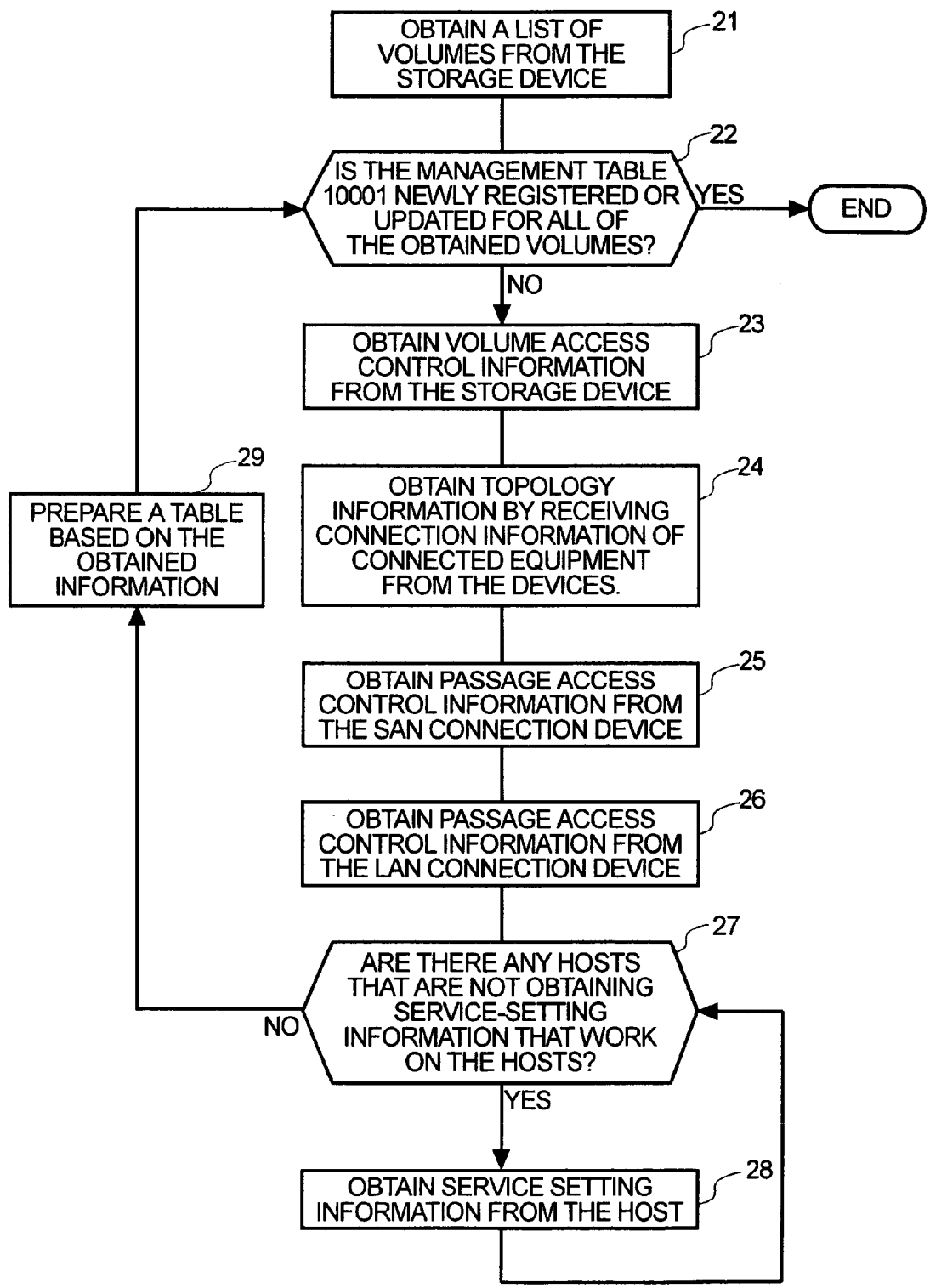
FIG. 2 is a flowchart illustrating a procedure of preparing a management table by a computer preparation module according to the embodiment.

FIG. 2 is a diagram illustrating a procedure for preparing a management table by the table preparation module of this embodiment.

The table preparation module 1104 requests to obtain volumes managed by the storage devices 12 through the management network 19, and obtains a list of volumes (step 21). Here, the storage device 12 may transmit, to the list preparation computer 11 in a pushing manner, a list of volumes that are to be managed through the management network 19 at regular intervals, when a fault has occurred in the storage device 12 or when the constitution is to be changed in the storage device 12. The table preparation module 1104 judges whether the management table 1001 is newly registered or updated for the obtained volumes (step 22). The processing ends when the management table 1001 has been newly registered or updated for all of the volumes included in the obtained list. When there exist volumes for which the management table 1001 has not been newly registered or updated, the processing is handed over to step 23.

The integral managing computer 11 transmits a request for obtaining volume access control information 1207 to the storage device 12 through the management network 19, and obtains the volume access control information 1207 (step 23).

The table preparation module 1104 transmits a request for obtaining physical connection information to the devices connected to the network of this embodiment through the management network 19, and obtains physical connection information (step 24). The physical connection information is expressed by a combination of the names of the interfaces (I/F) connected to the network 110 and to the operation network 18.

The table preparation module 1104 transmits a request for obtaining passage access control information 1505 of the SAN connection device 15 to the SAN connection device 15 through the management network 19, and obtains passage access control information 1505 (step 25). This step is omitted when there exists no SAN connection device 15 in the system.

The table preparation module 1104 transmits a request for obtaining passage access control information 1605 of the LAN connection device 16 to the LAN connection device 16 through the management network 19, and obtains passage access control information 1605 (step 26). This step is omitted when there exists no LAN connection device 16 in the system.

The table preparation module 1104 judges whether the application-setting information 1306 has been obtained from all host computers 13 that constitute the topology (step 26). That is, when there are host computers 13 that are not obtaining the application-setting information 1306, the routine proceeds to step 28. Otherwise, the routine proceeds to step 29.

The table preparation module 1104 transmits a request for obtaining application-setting information 1306 to the host computers 13 through the management network 19, and obtains the application-setting information (step 28).

The table preparation module 1104 prepares a management table based on the information obtained through steps 21 to 28 (step 29). Namely, based on the physical connection information obtained at step 24, access control information obtained at steps 23 and 25 and application-setting information 1306 obtained at step 28, the table preparation module 1104 prepares a management table 10001 by taking into consideration the physical and logical access control for each of the volumes 1201.

FIG. 10 is a diagram illustrating a management table according to the embodiment.

The management table 10001 in FIG. 10A includes the names of the client's computers constituting the network system, names of the volumes (names of the volumes such as LUs, LDEVs, host computers 13) for identifying the volumes, status and performance information of the volumes, names of the services using the volumes and names of the host computers that offer the services. In the drawing, the values of performance information of the volumes are those of each of the volumes used at the time of offering services to the client's computers 14. Here, however, the value may be a total value for each of the client's computers.

The management table 10001 of FIG. 10B is the one edited for every service name operating on the host computer 13, and includes the names of the volumes used for each of the service applications executed by the host computer 13 and includes the status and performance information of the volumes. In the drawing, the values of performance information of the volumes are those of each of the volumes used at the time of offering services. Here, however, the value may be a total value for each of the services.

Based on the management table 10001, the control unit 1102 in the integral managing computer 11 sends, to the output unit 1105, the volumes (such as LUs, LDEVs, hosts 13, etc.) used for each of the client's computers 14 or for each of the service applications and status and performance of the volumes.

Figure 11:
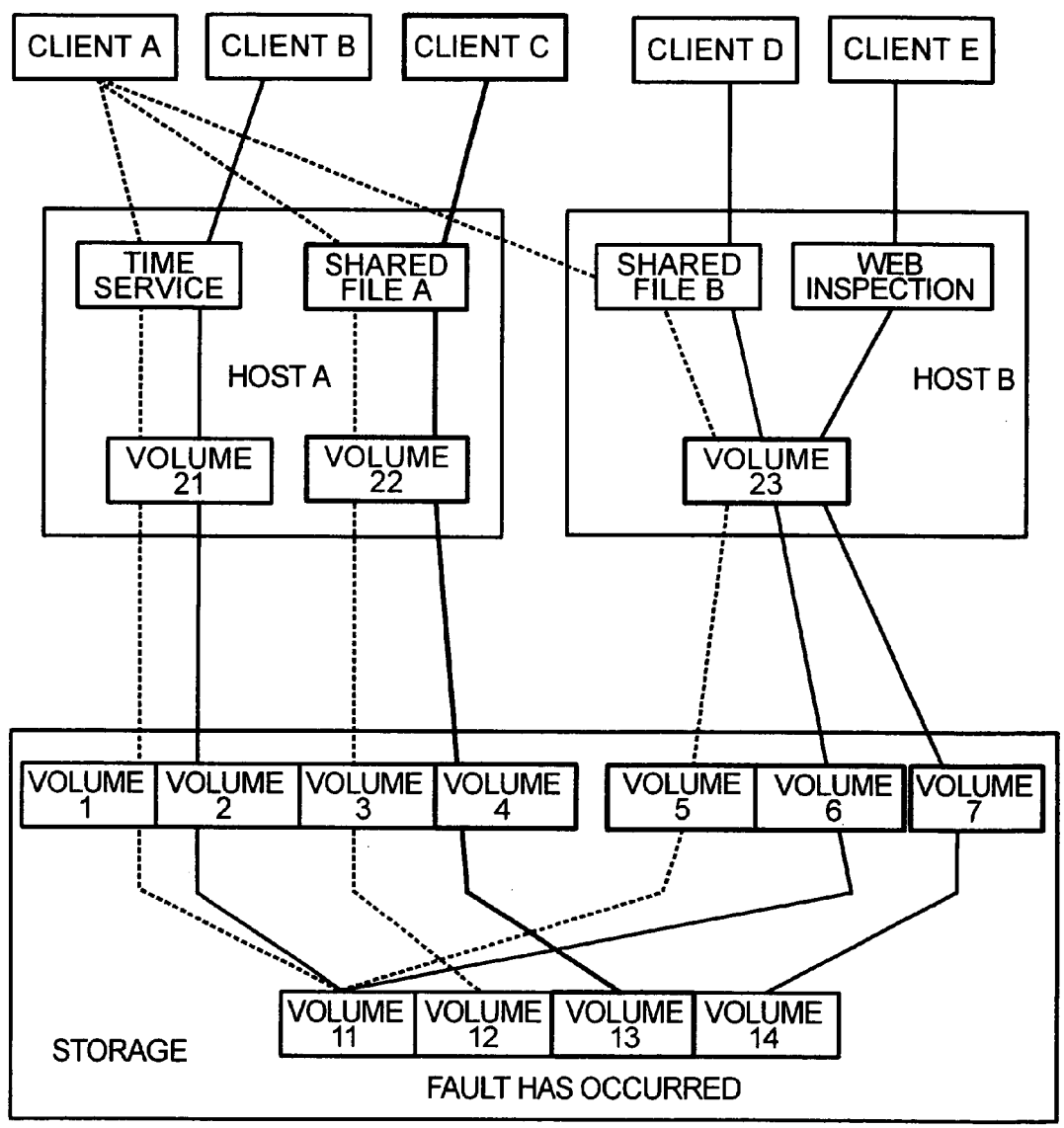
FIG. 11 is a diagram imaging the volumes, status of the volumes and output of performance used for each of the client's computers or for each of the service applications according to the embodiment.
Figure 13:
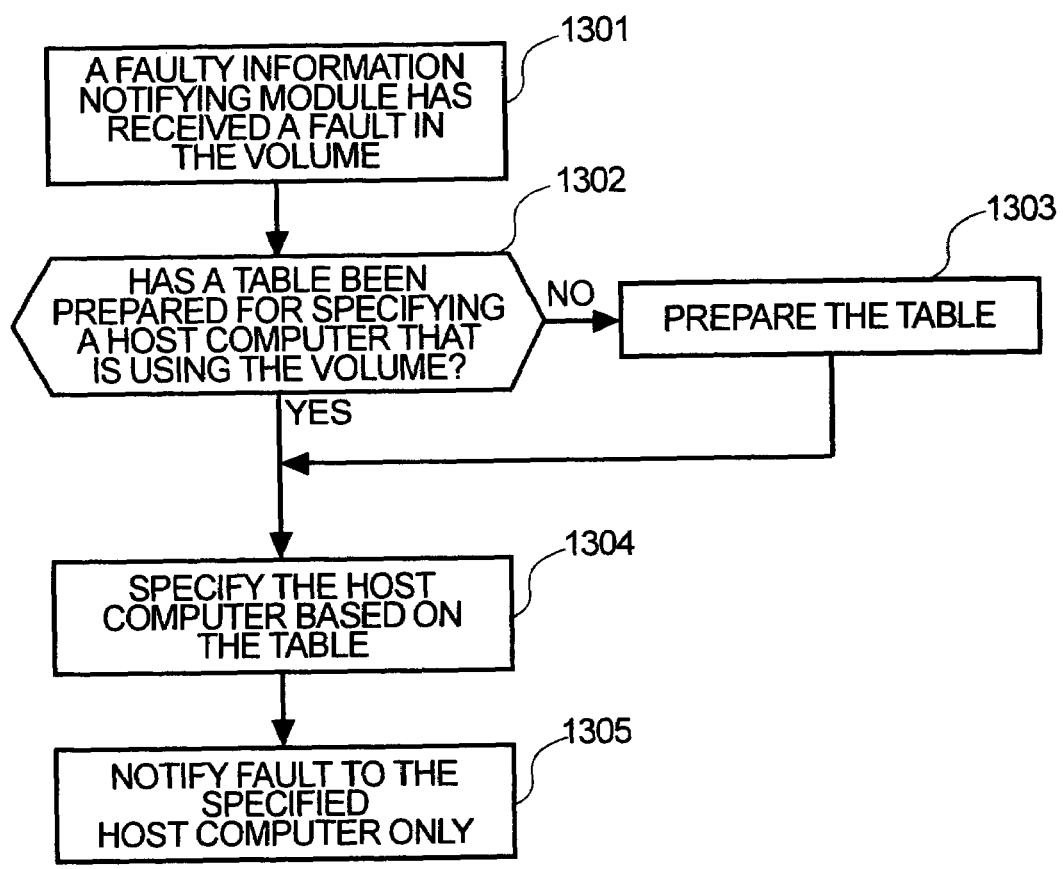
FIG. 13 is a flowchart illustrating a procedure for notifying the host computers of a fault that has occurred on a volume according to the first and second embodiments.

FIG. 11 is an image of the volumes and of the status and performance output of the volumes used for each of the client's computers or for each of the service applications according to the embodiment. This output image can be produced by the client's computer 14, host computer 13 and browser computer (not shown) connected through the management network 19 or the operation network.

FIG. 12 is a diagram illustrating a procedure of notifying a fault to the host computers that are using the volumes in case the volume becomes faulty.

The fault notifying module 1106 receives fault information of the volume 1201 through the management network 19 (step 1301).

The fault notifying module 1106 asks the table preparation module 1104 through the management network 19 concerning the presence of the management table (step 1302). When the table preparation module is not preparing the management table, the table preparation module prepares the management table through steps 21 to 29 (step 1303).

The fault notifying module 1106 specifies the faulty volume and the name of the host computer 100014 connected to the faulty volume relying upon the management table 100013 (step 1304), and notifies the fault to the specified host computers only through the management network 19 (step 1305).

The objects to which the fault is to be notified are not limited to the host computers only but may also be the clients computers in the management table 100011.

Next, described below is a procedure for dynamically and partly updating the management table 10001 at a timing of changing the constitution of the network system as will be described below.

Figure 7:
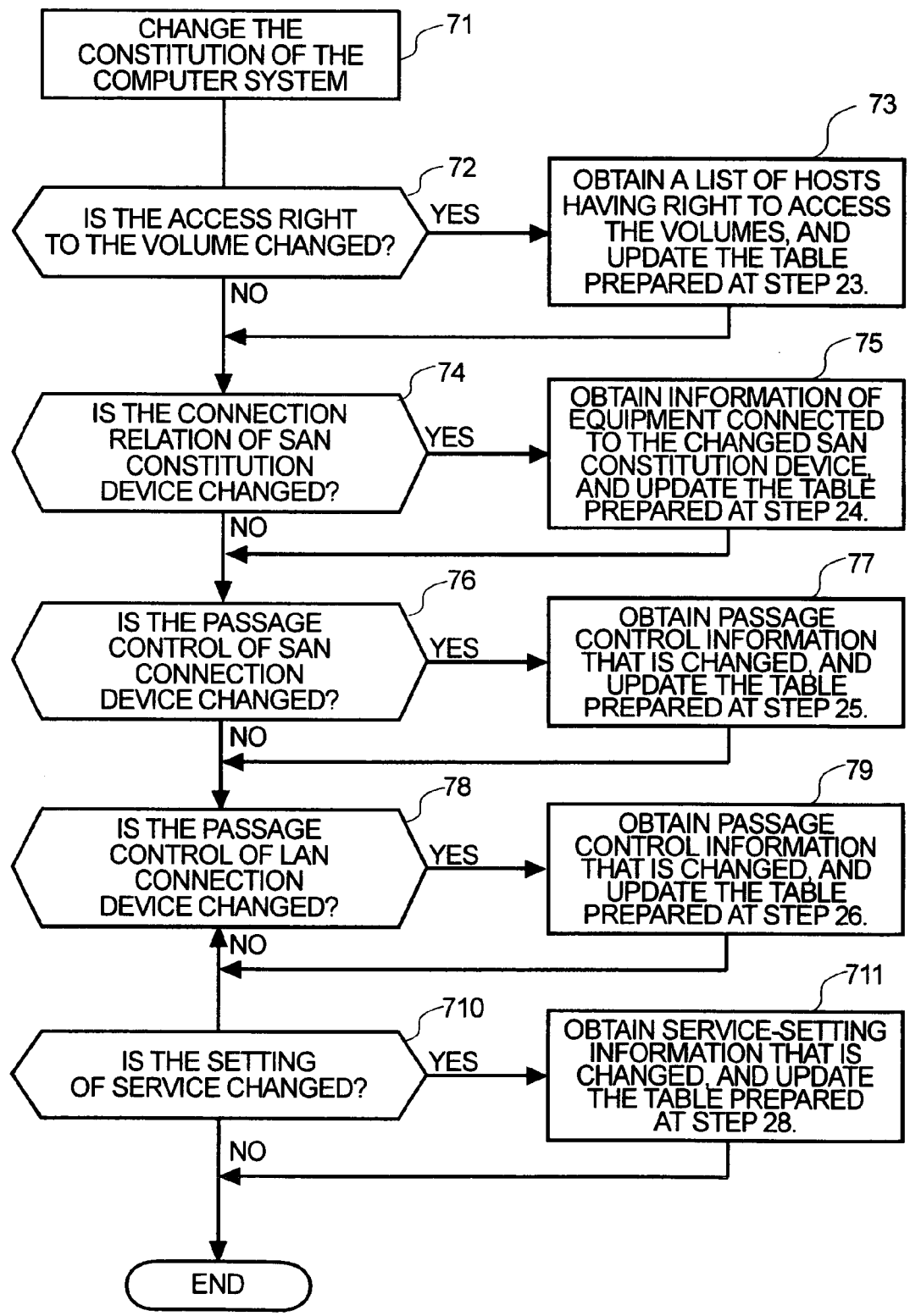
FIG. 7 is a flowchart illustrating a procedure for dynamically and partly updating the management table by the tape preparation module according to the embodiment.

FIG. 7 is a flowchart illustrating a procedure for dynamically and partly updating the management table by the table preparation module.

The table preparation module 1104 starts the following processing at regular intervals (step 71).

Here, however, the following processing may be started at a timing when the constituent information or status information is changed (such as when a fault has occurred, when a value of performance information has exceeded a given threshold value), or at a timing when the management interface (I/F) 1307 has received a request for obtaining information from an external unit such as the host computer 13 or the like. Further, the information necessary for controlling the management may be exchanged through the network 110 or the operation network 18.

At this moment, first, the table preparation module 1104 obtains information necessary for the management, such as physical connection information 2000, access control information 3000 and application-setting information 1306 according to a procedure as described with reference to FIG. 2. Here, based on the received information for changing the constitution of the network system, the table preparation module 1104 may specify necessary information out of physical connection information 2000, access control information 3000 and application-setting information 1306, and may transmit a request to a specified device to efficiently obtain the specified information only.

The table preparation module 1104 judges whether the volume access control information 1207 has been changed (step 72). When the volume access control information 1207 has been changed, the table preparation module 1104 updates the management table 10001 based upon the changed volume access control information 1207 (step 73).

The table preparation module 1104 judges whether the physical connection information 2000 has been changed (step 74). When the physical connection information 2000 has been changed, the table preparation module 1104 updates the management table 10001 based upon the changed physical connection information 2000 (step 75).

The table preparation module 1104 judges whether the passage access control information 1505 has been updated (step 76).

When the passage access control information 1505 has been updated, the table preparation module 1104 updates the management table 10001 based on the changed passage access control information 1505 (step 77). Here, however, steps 76 and 77 are omitted when there is no SAN connection device 15 in the system.

The table preparation module 1104 judges whether the passage access control information 1605 has been updated (step 78).

When the passage access control information 1605 has been updated, the table preparation module 1104 updates the management table 10001 based on the changed passage access control information 1605 (step 79). Here, however, steps 78 and 79 are omitted when there is no LAN connection device 16.

The integral managing computer 11 judges whether the application-setting information 1306 has been changed (step 710). When the application-setting information 1306 has been changed, the table preparation module 1104 updates the management table 10001 based on the changed application-setting information 1306 (step 711). Here, however, steps 710 and 711 are omitted when there is no host computer 13 that offer the services.

According to the above embodiment, the physical connection state is dynamically and partly updated as the network system is updated, and the management table 10001 for specifying the affecting range for each of the volumes is dynamically and partly updated at any time in response to a change in the logical access control or in the services offered by the host computers.

Figure 8:
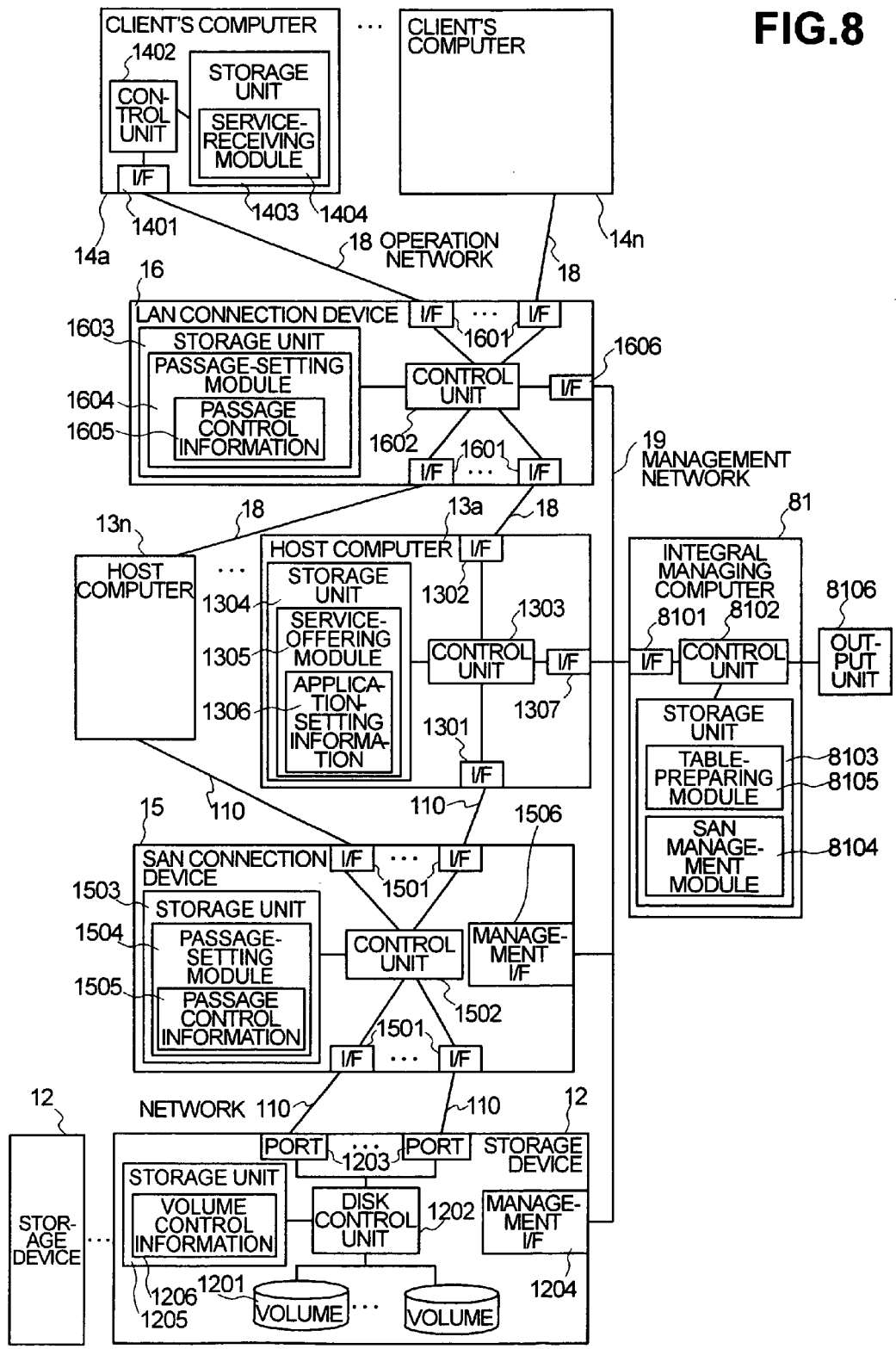
FIG. 8 is a diagram illustrating the constitution of the network system according to a second embodiment.

FIG. 8 is a diagram illustrating the constitution of a network according to a second embodiment.

The second embodiment has a great difference with respect to that the table preparation module 1104 (inclusive of the integral managing computer 11) and the SAN management module 1705 (inclusive of SAN management computer 17) of the first embodiment, are realized by using a management computer (integral managing computer 81). The host computer 13, client's computer 14, SAN connection device 15 and LAN connection device 16 are the same as those of the first embodiment, and are not described here.

The network system according to the embodiment includes storage devices 12, host computers 13, client's computers 14, a SAN connection device 15, a LAN connection device 16 and an integral managing computer 81.

The SAN managing computer 87 works to manage the storage devices 12, host computers 13, SAN connection device 15 and LAN connection device 16, that constitute the SAN, and includes a storage unit, an operating system stored in the storage unit, a SAN management module 8704, a table preparation module 8705, a control unit 8702 for executing the application program and an interface (I/F) 8701 for communication through the management network 19.

The SAN management module 8704 transmits a request for obtaining volume access control signal 1207 to the storage device 12 through the management network 19, and holds the volume access control information 1207 received through the management network 19 as volume management information.

The SAN management module 8704 works to transmit, through the management network 19, the requests for obtaining interface information in which the interfaces (I/F) connected to the network 110 are connected through the network 110, from the storage devices 12, host computers 13, client's computers 14 and SAN connection device 15, and holds, as connection information, the interface information received through the management network 19.

The SAN management module 8704 transmits a request for obtaining passage access control information 1505 possessed by the SAN connection device 15 to the SAN connection device through the management network 19, and holds the passage access control information 1505 received through the management network 19 as SAN passage access control information.

The SAN management module 8704 transmits a request for obtaining passage access control information 1605 possessed by the LAN connection device 16 to the LAN connection device through the management network 19, and holds the passage access control information 1605 received through the management network 19 as LAN passage access control information.

The SAN management module 8704 transmits a request for obtaining application-setting information 1306 of a service possessed by the host computer 13 to all host computers 13 connected to the network 110 through the management network 19, and holds the application-setting information 1306 received through the management network 19 as application-setting information.

Figure 9:
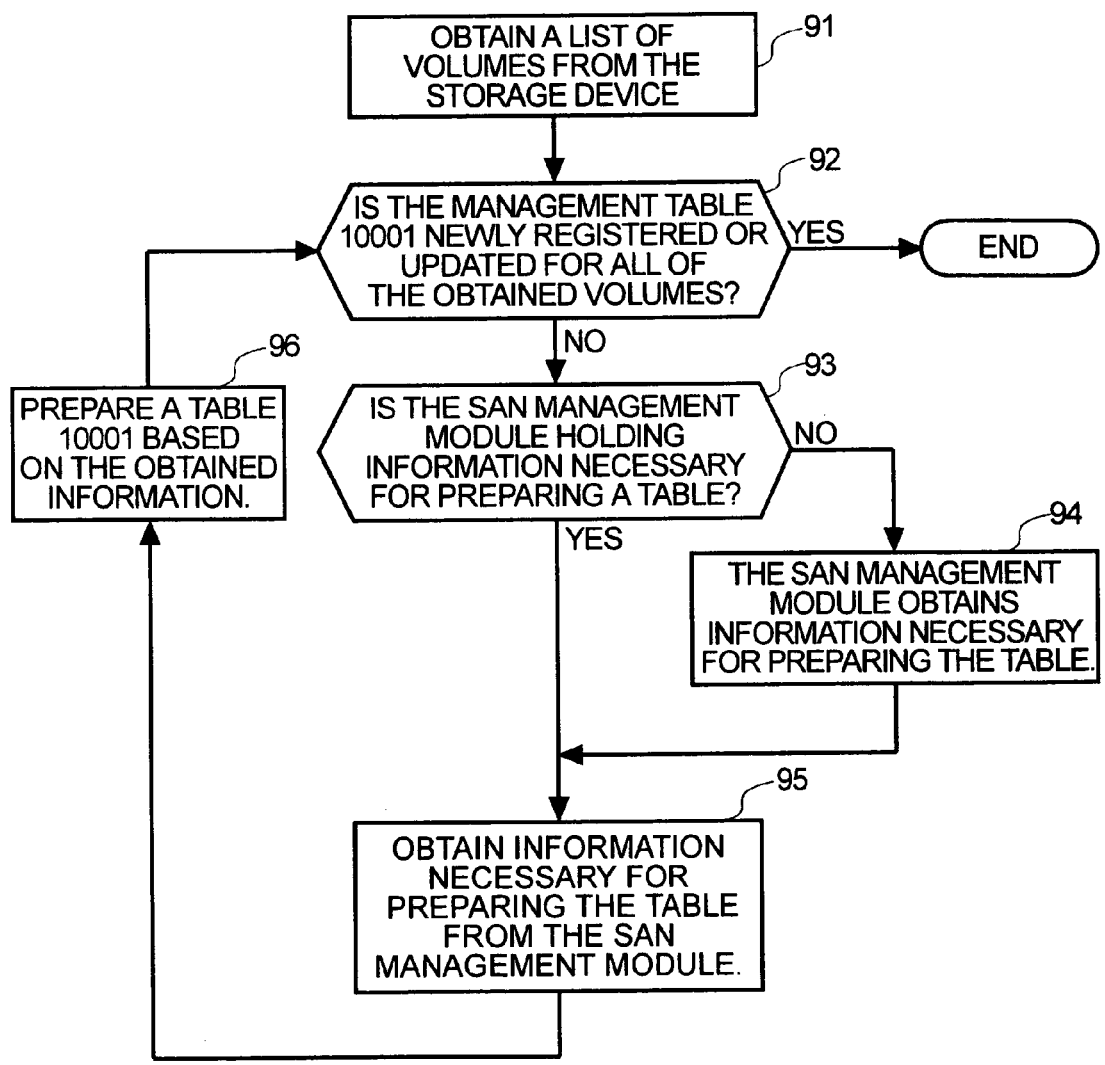
FIG. 9 is a flowchart illustrating a procedure for preparing a management table by the computer preparation module according to the embodiment.

FIG. 9 is a flowchart illustrating a procedure for preparing a management table by the table preparation module and SAN management module 8104 according to the embodiment. In this embodiment, the table preparation module 8105 prepares a management table 10001 by utilizing the physical connection information 2000, access control information 3000 or application-setting information 1306 collected by the SAN management module 8104.

The SAN management computer 87 transmits a request for obtaining volume access control information 1207 to the storage devices 12 through the management network 19, and obtains a list of volumes for preparing the management table 10001 (step 91). Here, the storage devices 12 may transmit volume access control information 1207 to the SAN management computer 87 through the management network 19 at regular intervals, when a fault has occurred in the storage unit 12 or when the constitution has changed in the storage devices 12.

If the management table 10001 has been prepared for all of the volumes included in the list obtained at step 91, the processing ends. If there are volumes for which the management table 10001 has not been prepared, the following processing is executed to prepare the management table 10001 (step 92).

The table preparation module 8705 makes sure if the volume management information, SAN topology information, SAN passage access control information, LAN passage access control information and application-setting information are held by the SAN management module 8704 (step 93). Among them, if there is information that has not been held by the SAN management module 8704, the SAN management module is asked to obtain the data (step 94). As for the information that has not been held, the table preparation module 8105 may obtain it by itself from the devices constituting the network.

The above information held by the SAN management module 8704 are fetched by the table preparation module 8705 (step 95).

The table preparation module 8705 prepares the management table 10001 based on the obtained information (step 96).

Based upon the thus prepared management table 10001, the fault in the volume is notified to the host computers according to a procedure of step 1301 to step 1305.

According to the managing computer which integrally manages a plurality of devices that constitute the network of the present invention, any fault that occurs in the volume is correctly notified by a host computer which can access the volumes.

What is claimed is:

1. A computer system comprising:
   storage devices coupling to a data communication network and to a management network, said storage devices including volumes for storing data and a storage control unit configured to control data transfer between the volumes and the data communication network;
   host computers coupling to the data communication network and to the management network;
   client computers coupling to the host computers through an operation network; and
   a management computer coupled to the management network,
   wherein the storage devices hold volume access control information, said volume access control information specifying computers authorized to access the volumes,
   wherein each host computer enables execution of one or more applications and holds application-setting information specifying a specific application to be provided for a specific client computer of said client computers and a specific volume of said volumes to be provided with the specified application,
   wherein the management computer acquires the volume access control information from the storage devices and the application-setting information from the host computer, and
   wherein the management computer correlates the volume access control information and the application-setting information to generate a management table defining a relationship between the specified volume and the specified client computer that exists via the host computer and the specified application, and sends, to the specified client computer, information related to the specified volume, and wherein the management computer sends to the specified client computer notification of a fault when the fault occurs in the specified volume.

2. A computer system according to claim 1,
   wherein the storage devices further hold both performance information and status information related to the volumes, and
   wherein the management computer further acquires the performance information and the status information from the storage devices via the management network, adds the performance information and status information to the information correlated in the management table.

3. A computer system according to claim 1,
   wherein the management computer includes an output unit for displaying an image, and outputs to the output unit, an image data representing a correlation between the client computers and the volumes, including the host computers and the applications.

4. A computer system according to claim 1,
   wherein said management table includes managing person control information, said managing person control information specifying for said volumes or said client computers management IDs for identifying a managing person or the management computer as being permitted to manage said volumes or said client computers.

5. A computer system enabling notification of a fault in a volume, comprising:
   one or more storage devices able to couple to a data communication network and to a management network, each of said storage devices including volumes for storing data and a storage control unit configured to control data transfer between the volumes and the data communication network;
   at least one host computer able to couple to the data communication network and to the management network;
   client computers able to couple to the host computers through an operation network; and
   a management computer coupled to the management network,
   wherein the storage devices hold volume access control information, said volume access control information specifying computers that can access the volumes,
   wherein the host computer offers for execution one or more service applications and holds application-setting information specifying a specific application to be provided for a specific client computer of said client computers and a specific volume of said volumes to be provided with the specified application,
   wherein the management computer acquires the volume access control information from the storage devices and the application-setting information from the host computer,
   wherein the management computer correlates the volume access control information with the application-setting information to generate a management table that defines a relationship between the specified volume and the specified client computer that exists via the host computer and specified application, and wherein the management computer sends to the specified client computer notification of a fault when the fault occurs in the correlated specified volume.

6. A computer system according to claim 5,
wherein the management computer includes an output unit for displaying an image, and outputs to the output unit, an image data representing a correlation between the client computers and the volumes, including the host computers and the applications.

7. A computer system according to claim 5,
wherein said management table includes managing person control information, said managing person control information specifying for said volumes or said client computers management IDs for identifying a managing person or the management computer as being permitted to manage said volumes or said client computers.

8. A computer system enabling notification of a fault in a volume, comprising:

one or more storage devices able to couple to a data communication network and to a management network, each of said storage devices including volumes for storing data and a storage control unit configured to control data transfer between the volumes and the data communication network;

at least one host computer able to couple to the data communication network and to the management network;

client computers able to couple to the host computers through an operation network; and a management computer coupled to the management network, wherein the storage devices hold volume access control information, said volume access control information specifying computers that can access the volumes, wherein the host computer offers for execution one or more service applications and holds application-setting information specifying a specific application to be provided for a specific client computer of said client computers and a specific volume of said volumes to be provided with the specified application, wherein the management computer acquires the volume access control information from the storage devices, the application-setting information from the host computer, and passage access control information from the data communication and/or the operation network wherein the management computer correlates the volume access control information with the application-setting information and the passage access control information to generate a management table that defines a relationship between the specified volume and the specified client computer that exists via the host computer, the specified application and passage access, and wherein the management computer sends to the specified client computer notification of a fault when the fault occurs in the specified volume.

9. A computer system according to claim 8,
wherein the management computer includes an output unit for displaying an image, and outputs to the output unit, an image data representing a correlation between the client computers and the volumes, including the host computers and the applications.

10. A computer system according to claim 8,
wherein said management table includes managing person control information, said managing person control information specifying for said volumes or said client computers management IDs for identifying a managing person or the management computer as being permitted to manage said volumes or said client computers.

\* \* \* \* \*